United States Patent [19]

Perisho et al.

[11] Patent Number: 5,182,963
[45] Date of Patent: Feb. 2, 1993

[54] SOFT RELEASE CONTROL MECHANISM WITH SPRING CLUTCH AND VISCOUS DAMPING

[75] Inventors: Randal J. Perisho; Robert L. Heimann, both of Moberly; Wayne L. Soucie, Columbia, all of Mo.

[73] Assignee: Orscheln Co., Moberly, Mo.

[21] Appl. No.: 750,298

[22] Filed: Aug. 27, 1991

[51] Int. Cl.$^5$ ............................................. G05G 1/14
[52] U.S. Cl. ......................................... 74/512; 74/531; 74/539; 188/20; 188/79.52
[58] Field of Search .............. 74/512, 531, 539; 188/20, 79.52, 251 R, 251 A, 255, 264 R, 264 B, 264 E; 192/113 B

[56] References Cited

U.S. PATENT DOCUMENTS

| | | | |
|---|---|---|---|
| 3,236,121 | 2/1966 | Gdowik et al. | 74/531 |
| 3,625,087 | 12/1971 | Flory et al. | 74/512 |
| 3,831,258 | 8/1974 | Elbert et al. | 428/592 |
| 3,891,398 | 6/1975 | Odier | 428/609 X |
| 4,344,795 | 8/1982 | Endo et al. | 188/251 A X |
| 4,799,955 | 1/1989 | McClellan | 428/570 |
| 4,833,040 | 5/1989 | Fishman et al. | 428/570 |
| 4,850,242 | 7/1989 | Hass et al. | 74/512 |
| 4,954,171 | 9/1990 | Takajo et al. | 428/570 X |

FOREIGN PATENT DOCUMENTS 1212993  3/1960  France ................................. 74/531

Primary Examiner—Leslie A. Braun
Assistant Examiner—William O. Trousdell
Attorney, Agent, or Firm—Laubscher & Laubscher

[57] ABSTRACT

A control mechanism of the soft release type includes a cylindrical drum about which is concentrically arranged a helical clutch spring the coil turns of which are normally contracted radially inwardly into frictional engagement with the outer periphery of the drum, characterized in that the drum is formed of powdered metal that is impregnated with damping oil. Owing to the direction of the coil turns, the drum may be rotated only in a first direction relative to the spring, and upon radial outward expansion of the spring, the viscous film of the damping oil between the outer periphery of the spring affords controlled soft-release of the drum for rotation in the opposite direction.

7 Claims, 2 Drawing Sheets

SOFT RELEASE CONTROL MECHANISM WITH SPRING CLUTCH AND VISCOUS DAMPING

STATEMENT OF THE INVENTION

A control mechanism of the soft release type is disclosed which includes a cylindrical drum about which is concentrically arranged a helical clutch spring the coil turns of which are normally contracted radially inwardly into frictional engagement with the outer periphery of the drum, characterized in that the drum is formed of powdered metal that is impregnated with damping oil.

BRIEF DESCRIPTION OF THE PRIOR ART

Parking brake systems of the helical spring type are disclosed in the prior art, as evidenced, for example, by the prior U.S. Pat. Nos. to Gdowik et al 3,236,121 and Hass et al 4,850,242. These mechanisms are used in parking brake control arrangements to hold the brake in a tension set or brake-engaged condition. A release means (such as a manually operable release rod or fluid pressure-operated motor) is provided to expand the spring clutch and thus release a brake lever that is under sustained load. Spring clutch control devices as disclosed by these patents afford a significant advantage over the prior pawl and ratchet type of parking brake control means by affording an infinite position locking device, thereby avoiding pawl "skip-out" on the typical ratchet teeth. Pawl and ratchet mechanisms result in an action termed "slam off" and produce a large noise and vibration when the parking brake lever is allowed to rapidly accelerate after disengagement. Because the amount of drag applied to the gear drum by a spring clutch is dependant upon surface friction, the mechanism as expressed in current applications is only functional for low cable loads upon the parking brake system.

It is also known in the prior art—as for example, in the fabrication of oil-retaining bearings—to impregnate powdered metal parts with lubrication oil. Impregnation is achieved by soaking the parts in heated oil, or by a vacuum technique. As the impregnated part is subjected to cyclic usage, friction heats the powdered metal surface causing expansion and forcing the impregnation oil to the bearing surface. Upon cooling, the oil returns into the powdered metal pores by capillary action. Impregnation of powdered metal parts is commonly done to provide lubrication, to protect parts against wear and to protect them from corrosion. Because powdered metal parts are porous, oil impregnation is often utilized to prevent any moisture from being trapped internally and thus quickly corroding the part from the inside out.

The present invention was developed to provide an improved soft release control mechanism in which the viscous film of a damping oil between the outer periphery of an oil-impregnated porous metal powdered drum and the associated helical clutch spring is utilized to afford progressively controlled soft release.

SUMMARY OF THE INVENTION

Accordingly, a primary object of the present invention is to provide a soft release control mechanism in which the cylindrical drum upon which the helical clutch spring is concentrically mounted is formed of powdered metal impregnated with a damping oil, whereby upon progressive radial outward expansion of the spring, the layer of viscous film of the damping oil between the drum and the inner periphery of the spring affords controlled soft-release of the drum. The present invention thus provides soft-release control of the operating lever at high cable loads and for an extended number of cycles of operation at operating temperatures between the extremes of $-40°$ to $180°$ F.

According to a more specific object of the invention, the turns of the helical spring each have a rectangular cross-section for maximum engagement with the molecular layer of damping oil located between the drum member and the spring clutch. The viscous film of the damping oil resists motion as the surfaces rub and rotate relative to each other. Frictional heat from motion between the two parts causes the mechanism to perpetuate its soft release properties by forcing more damping oil from inner pores of the part to the surface of the gear drum. By the use of the damping oil of the present invention, consistent, long-lasting soft release control by viscous damping is achieved.

According to a further object of the invention, soft release control is achieved by modifying the secondary manufacturing process in the fabrication of the powdered metal gear drums. To attain the object of the invention, the gear drums are manufactured with a special powdered metal mix that produces a high porosity part. The increased porosity affords an increased volume for the damping oil to fill during the impregnation process. The powdered metal part is subjected to a special heat treatment process to impart greater strength and superior wear resistance characteristics to the gear drum (which is more porous and thus structurally weaker). The gear drum then undergoes an impregnation process which fills the inner pores of the port with a special dampening oil designed to resist frictional rotation of two close fitting parts. This dampening oil is specially blended to provide soft release control and regulation at temperatures of in the range of $-40°$ to $+180°$ F.

BRIEF DESCRIPTION OF THE DRAWING

Other objects and advantages of the invention will become apparent from a study of the following specification when viewed in the light of the accompanying drawings, in which.

DETAILED DESCRIPTION

Figure 3:
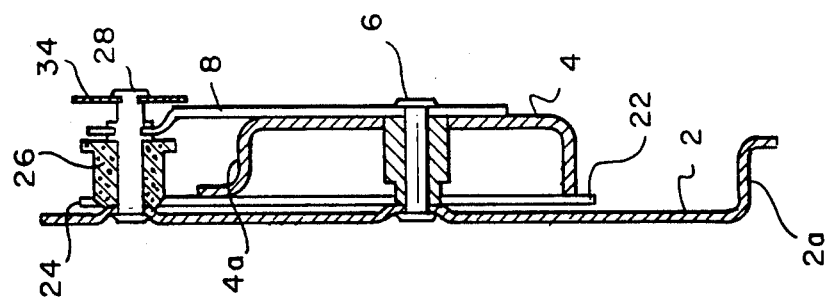
FIG. 3 is a sectional view, with certain parts omitted for clarity, taken long line 3—3 of FIG. 1.
Figure 2:
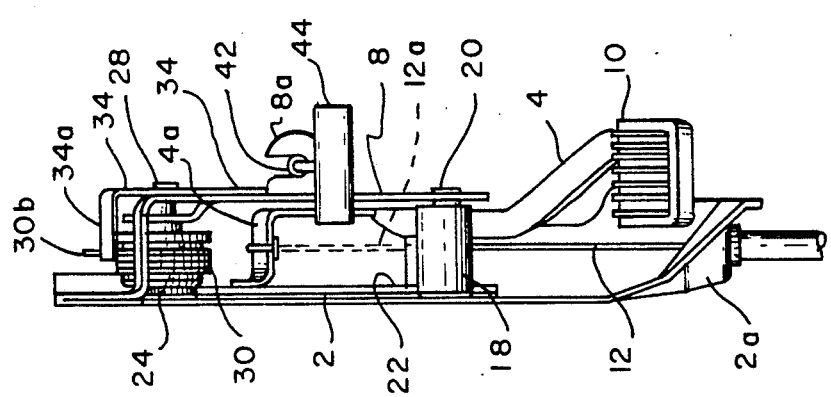
FIGS. 1 and 2 are front and left-hand side views, respectively, of the parking brake system of the present invention.
Figure 1:
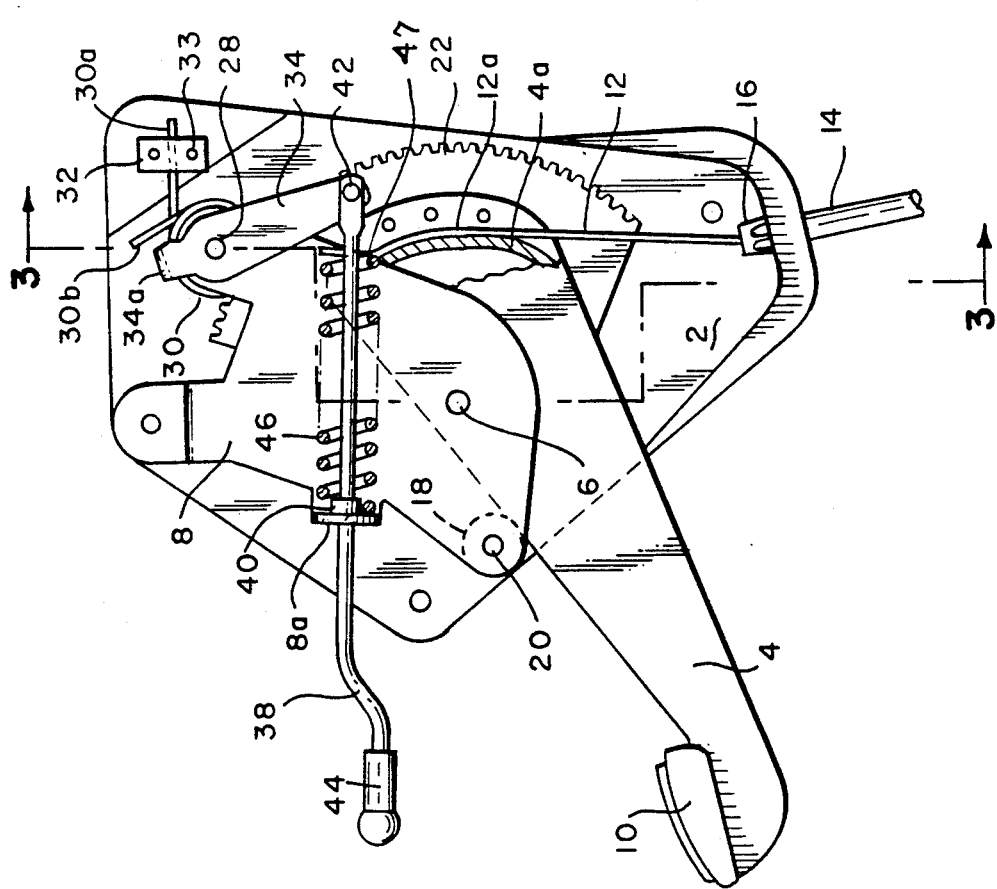
Figure 4:
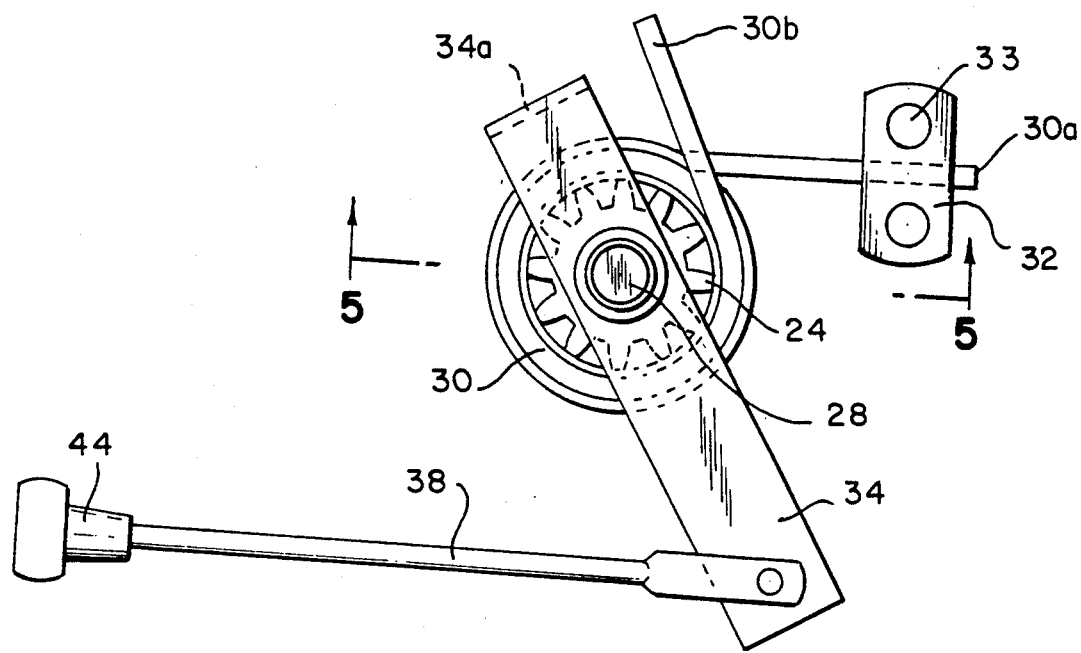
FIG. 4 is a detailed view of the spring release operating mechanism.
Figure 5:
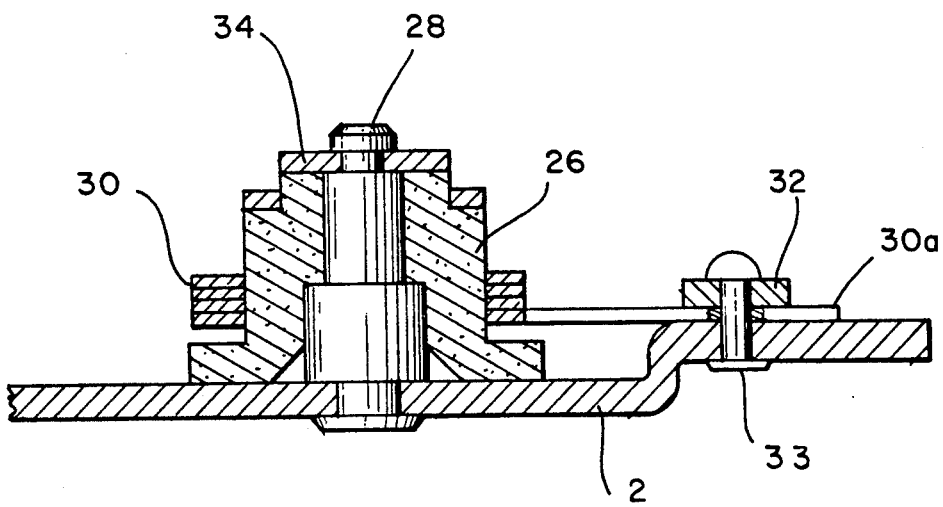
FIG. 5 is a sectional view taken along line 5—5 of FIG. 4.

Referring first more particularly to FIGS. 1-3 the soft release control mechanism of the present invention includes a metal support bracket 2 that is adapted for connection with the fire wall of a vehicle. A foot-operated parking brake lever 4 is pivotally connected intermediate its ends with the bracket 2 by means of pivot pin 6 the ends of which are supported in corresponding openings contained in bracket 2 and cover member 8, respectively. At one end, the lever 4 is provided with a foot pedal 10, and at its other end the lever has a convex portion 4a upon the outer surface of which is supported the free end portion 12a of the inner stand 12 of the parking brake cable assembly. The parking brake cable assembly includes an outer sleeve member 14 that is connected at its free end by connector means 16 with the bracket wall portion 2a. Thus, when parking brake lever 4 is depressed by the engagement of pedal 10 by the foot of the vehicle operator, lever 4 is pivoted in the counter-clockwise direction to tension the inner cable member 12, thereby to apply the vehicle parking brakes (not shown). Movement of the lever 4 in the clockwise direction is limited by the resilient bumper stop member 18 that is connected between the cover member 8 and the bracket 2 by pin 20.

Rigidly connected with the end portion 4a of lever 4 is a gear sector 22 that is in enmeshing engagement with a corresponding pinion gear 24 that is secured to one end of a clutch drum 26 that is rotatably supported between the bracket 2 and cover member 8 by support pin 28. Concentrically mounted upon the clutch drum 26 is a helical clutch spring 30 one end 30a of which is rigidly connected with the bracket 2 by means of mounting plate 32 and fastening means 33. The other spring end 30b projects tangentially outwardly for engagement by the orthogonally arranged tab portion 34a of a release lever 34 that is pivotally mounted intermediate its ends on pivot 28. The helical clutch spring 30 is normally resiliently contracted radially inwardly int frictional engagement with the outer peripheral surface of the clutch drum 26, thereby to resist rotation of the drum 26 relative to spring 30 and bracket 2. As is known in the art, depending upon the direction of winding of the coil turns of spring 30 on drum 26, the drum may be rotated in one direction relative to the spring, but rotation of the drum in the opposite direction relative to the spring is prevented, owing to the frictional engagement between the radially inwardly contracted spring 30 and the outer peripheral surface of the drum 26. In order to pivot release lever 34 in the clockwise direction to cause the end portion 34a to engage the spring end 30b and thereby expand the clutch spring 30, there is provided a release lever 38 that is guided for longitudinal displacement within a tubular bushing 40 that is mounted in a corresponding opening contained in an orthogonally arranged projection 8a on the cover member 8. At one end, the release lever 38 is connected by pivot 42 with the corresponding end of release lever 34, and at its other end the release rod 38 is provided with a hand-operated release knob 44. Helical spring 46 is arranged concentrically about the release rod 38 between tab 8a on cover member 8 and a washer 47 mounted on rod 38 adjacent the pivot 42. Thus, spring 46 normally biases release rod 38 to the right, thereby to pivot release lever 34 in the counter-clockwise direction about pivot 28. When lever 38 is retracted manually to the left by release knob 44, release lever 34 is pivoted in the clockwise direction to cause the orthogonally arranged tab portion 34a to engage the spring free end 30b, thereby to expand the clutch spring radially outwardly to release drum 26. Owing to the tension of the inner cable member 12, lever 4 is pivoted in the clockwise direction toward the brake-released position of FIG. 1 in engagement with the bumper stop member 18, as shown.

In accordance with the characterizing feature of the present invention, the drum 26 is formed of a powdered metal material that is impregnated with damping oil, the turns of the clutch spring 30 each having a rectangular cross-sectional configuration, thereby to effect maximum surface engagement with the outer periphery of the clutch drum 26. The powdered metal from which the drum is formed is a nickle-iron powder mixture the material designation of which is FN-0205. The chemical composition of this material is 91.9 to 98.7% iron, 1.0 to 3.0% nickel, 0.3 to 0.6% carbon, and 0 to 2.5% copper. The porous powdered metal drum is impregnated with a suitable damping oil, such as a polyalphaolefin. One example of a suitable damping oil is Blend 310-B manufactured by William F. Nye Company of New Bedford, Mass. The powdered metal drum has a density of about 6.6 grams per cubic centimeter and a minimum Rockwell hardness of C 39. A suitable example of the spring steel material from which the clutch spring 30 is formed is MB grade steel SAE 1065.

One process for forming the powdered metal drums is as follows:

(1) Mold the drums by compressing the FN-0205 powdered metal in a press;

(2) Sinter the parts in an oven at 2100° F. for about 3½ hours. The parts are stacked on a belt in two layers with a screen separating them. The belt is set to take 2 ½ minutes to go one foot. Flanges on the parts must not touch. Dimensions on two parts every three hours are checked for statistical process control;

(3) The parts are then air cooled and sent to the heat treatment means;

(4) The powdered metal parts are placed in an atmosphere controlled furnace for 45 minutes at 1550° F. to austenize the steel. The parts are "carburized" by using an endothermic gas to keep the carbon mixture at 0.5 percent while in the furnace;

(5) The parts are quenched in oil for 20 minutes at 180° F. to form the martensite microstructure in the steel material;

(6) The parts are dunked and washed in a water solution at 150° to 180° F. to remove surface quench oil;

(7) The parts are placed in another furnace at 300° F. for one hour and twenty minutes to "draw" them. This tempers them to remove some of the brittleness;

(8) The parts are then air cooled for oil impregnation;

(9) Parts are placed in a vat and submerged in a special damping oil (#310-B from Nye) that is at 140° to 160° F. The entire vat is placed in a chamber at 28 psi for seven minutes. The chamber is then opened to ambient for seven minutes and finally a vacuum of 29.5 inches mercury is drawn and maintained for seven minutes to completely fill the voids with oil; and

(10) The parts are removed from the vat and centrifuged to remove excess oil from the surface. They are then shipped for assembly to the parking brake levers.

The pinion gear is adhesively bonded to the associated end of the powdered metal drum, although it is possible that the gear could be formed integrally with the drum.

In operation, the impregnated drum provides a regulated soft release control for high torque rotational devices, such as parking brake systems. The viscous film of the damping oil resists motion as the surfaces of the spring and the drum rub and rotate relative to each other. Frictional heat from motion between the two parts causes the mechanism to perpetuate its soft release properties by forcing more damping oil from inner pores of the part to the surface of the gear drum.

While the preferred forms and embodiments of the inventions have been illustrated and described, it will be apparent that changes may be made without deviating from the inventive concepts set forth above.

What is claimed is:

1. A soft-release parking brake control mechanism for applying tension to a parking brake cable, comprising:
   (a) a mounting bracket (2);
   (b) means including a parking brake lever (4) pivotally connected with said bracket and with one end of the parking brake cable, said lever being pivotable in one direction toward a brake-applied position in which said cable is tensioned;
   (c) resilient bumper means (18) connected with said bracket for limiting pivotal movement of said lever in the opposite direction toward a brake-released position relative to said bracket;
   (d) means for retaining said lever in said brake-applied position, said retaining means including:
      (1) a cylindrical clutch drum (26) rotatably connected with said mounting bracket, said drum being formed of an iron-nickel powdered metal admixture impregnated with a polyalphaolefin damping oil, said clutch drum having inner pores and an outer surface with a layer of said damping oil thereon;
      (2) gear means (22,24) connecting said drum with said lever for rotation in opposite directions as said lever is pivoted between its brake-applied and brake-released positions, respectively; and
      (3) a helical clutch spring mounted on centrically on said drum, said spring including at opposite ends a pair of end portions one of which is connected with said bracket, said spring having coil turns the diameter of which is such relative to the diameter of said drum that said spring is normally resiliently contracted radially inwardly into functional engagement with the outer periphery of the drum, thereby to permit rotation of the drum in a first direction relative to said bracket, when said lever is pivoted toward the brake-applied position, in accordance with the direction of turn of said spring coil turns, said clutch spring normally preventing rotation of said drum in the opposite directions;
   (e) release means for displacing the other end of said spring to progressively expand said spring relative to said drum; and
   whereby the layer of said damping oil between said drum and the inner periphery of said spring causes a resistance to motion between said drum and said spring and whereby the frictional heat caused by said resistance to motion perpetuates the soft release properties of said mechanism by forcing said polyalphaolefin damping oil from the inner pores of the drum to the outer surface of the drum.

2. Apparatus as defined in claim 1, wherein said admixture also includes graphite powder.

3. Apparatus as defined in claim 2, wherein said admixture also includes copper powder.

4. A soft-release control mechanism, including:
   (a) a mounting bracket;
   (b) a cylindrical clutch drum rotatably connected with said mounting bracket, said drum being formed of a porous powdered iron material having a density of about 6.6 grams per cubic centimeter impregnated with polyalphaolefin damping oil;
   (c) a helical clutch spring mounted concentrically on said drum, the turns of said spring each having a rectangular cross-sectional configuration, said spring including at opposite ends a pair of end portions one of which is connected with said bracket, said spring having coil turns the diameter of which is such relative to the diameter of said drum that said spring is normally resiliently contracted radially inwardly into functional engagement with the outer periphery of the drum, thereby to permit rotation of the drum in a first direction relative to said bracket in accordance with the direction of turn of said spring coil turns, while preventing rotation of said drum in the opposite direction;
   (d) release means for operating the other end of said spring to progressively expand said spring relative to said drum; and
   whereby the layer of said damping oil between said drum and the inner periphery of said spring causes a resistance to motion between said drum and said spring and whereby the frictional heat caused by said resistance to motion perpetuates the soft release properties of said mechanism by forcing said polyalphaolefin damping oil from the inner pores of the drum to the outer surface of the drum.

5. Apparatus as define din claim 4, wherein said damping oil comprises Blend 310-B manufactured by William F. Nye of New Bedford, Mass., and further wherein said powdered metal admixture has a material designated code of FN-0205.

6. Apparatus as defined in claim 5, wherein said spring steel comprises MB grade steel SAE 1065.

7. Apparatus as defined in claim 5, wherein said drum is formed by the process including the steps of :
   (1) compressing the powdered metal to mold the same into the drum configuration;
   (2) sintering the drum for about 3½ hours at about 2100° F.
   (3) air cooling the drum;
   (4) heating the drum in a furnace for about 45 minutes at a temperature of about 1550° F., thereby to austenize the drum, said drum also being carburized in the furnace by using an endothermic gas to keep the carbon mixture at 0.5 percent;
   (5) quenching the drum in an oil bath for about 20 minutes at about 180° F., thereby to form a martensite microstructure in the drum;
   (6) damping and washing the drum in a water solution at about 150° F. to about 180° F. to remove surface quenched oil from the drum;
   (7) tempering the drum in a furnace at about 300° F. for about one hour and twenty minutes, thereby to draw the drum;
   (8) air cooling the drum to room temperature;
   (9) submerging the drum in a vat of damping oil at about 140° F. to bout 160° F., and placing the vat in a chamber at about 28 psi for about seven minutes;
   (10) opening the chamber to ambient air for about seven minutes;
   (11) subjecting the chamber to a vacuum of about 29.5 inches mercury for bout seven minutes, thereby to fill the voids on the drum with the damping oil;
   (12) removing the drum from the vat; and
   (13) centrifuging the drum to remove excess damping oil therefrom.

* * * * *

UNITED STATES PATENT AND TRADEMARK OFFICE
CERTIFICATE OF CORRECTION

PATENT NO. : 5,182,963

DATED : February 2, 1993

INVENTOR(S) : Perisho, et.a l.

It is certified that error appears in the above-indentified patent and that said Letters Patent is hereby corrected as shown below:

Column 5, claim 1, line 27, cancel"oncentrically", and insert -- concentrically --; line 41, cancel "directions", and insert -- direction--.

Column 6, claim 5, line 1, cancel "define din", and isnert --defined in--.

Column 6, claim 7, lines 24 and 29, cancel "bout", and insert --about --.

Signed and Sealed this

Twenty-sixth Day of April, 1994

Attest:

BRUCE LEHMAN

Attesting Officer

Commissioner of Patents and Trademarks